United States Patent
Merino Lopez

(10) Patent No.: US 7,281,557 B2
(45) Date of Patent: Oct. 16, 2007

(54) EXTENDED MOBILITY TIRE WITH UNDULATING SIDEWALLS

(75) Inventor: José Merino Lopez, Riom (FR)

(73) Assignee: Michelin Recherche Et Technique S.A., Granges-Paccot (CH)

(*) Notice: Subject to any disclaimer, the term of this patent is extended or adjusted under 35 U.S.C. 154(b) by 16 days.

(21) Appl. No.: 11/131,318

(22) Filed: May 18, 2005

(65) Prior Publication Data

US 2005/0263230 A1 Dec. 1, 2005

Related U.S. Application Data

(63) Continuation of application No. PCT/EP03/12499, filed on Nov. 10, 2003.

(30) Foreign Application Priority Data

Nov. 18, 2002 (FR) .................. 02 14484

(51) Int. Cl.
  B60C 17/00 (2006.01)
  B60C 17/08 (2006.01)
  B60C 3/00 (2006.01)
  B60C 9/02 (2006.01)
  B60C 13/02 (2006.01)

(52) U.S. Cl. .............. 152/454; 152/516; 152/522; 152/523; 152/550; 152/555

(58) Field of Classification Search ............. 152/454, 152/457, 516, 522, 523, 555, 556, 557, 550
See application file for complete search history.

(56) References Cited

U.S. PATENT DOCUMENTS

| | | | |
|---|---|---|---|
| 3,240,250 A | | 3/1966 | Frazier |
| 3,400,746 A | * | 9/1968 | Heimovics, Jr. ............ 152/522 |
| 3,500,888 A | * | 3/1970 | Boileau ....................... 152/556 |
| 5,616,198 A | | 4/1997 | Suzuki et al. |
| 5,660,656 A | | 8/1997 | Herbelleau et al. |
| 2003/0145935 A1 | | 8/2003 | Prost et al. |
| 2005/0236086 A1* | | 10/2005 | Lopez ......................... 152/454 |

FOREIGN PATENT DOCUMENTS

| JP | 02234812 A | * | 9/1990 |
|---|---|---|---|
| WO | WO 02/30688 | | 4/2002 |

OTHER PUBLICATIONS

Abstract of JP 10-44721 A, Feb. 17, 1998.

* cited by examiner

Primary Examiner—Adrienne C. Johnstone
(74) Attorney, Agent, or Firm—Buchanan Ingersoll & Rooney PC

(57) ABSTRACT

A tire includes at least one carcass-type reinforcement structure anchored on each side in a bead, each bead being extended radially towards the outside by a sidewall having at least one substantially resilient circumferential cord disposed in the substantially median portion of the sidewalls. The carcass-type reinforcement structure includes a ply of carcass cords extending from the bead to the crown within a sidewall. The carcass cords are arranged in such a way that, in a sidewall zone restricted to the median portion of the sidewall, the carcass cords exhibit different respective axial positions, so as to form around the circumference a succession of substantially regular undulations defining an undulating circumferential profile. Outside of the sidewall zone, the carcass cords of the ply do not form undulations. At reduced pressure the undulations tend to straighten out and rigidify the sidewall in such a way as to be able to bear the load.

5 Claims, 8 Drawing Sheets

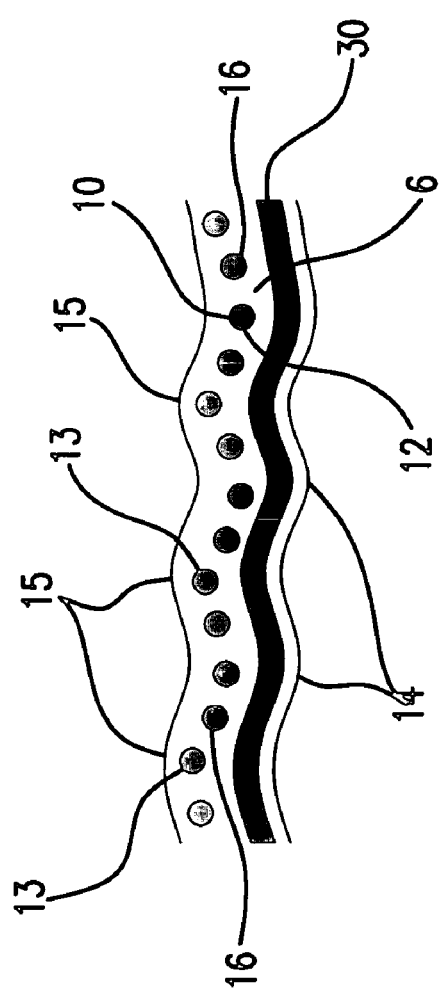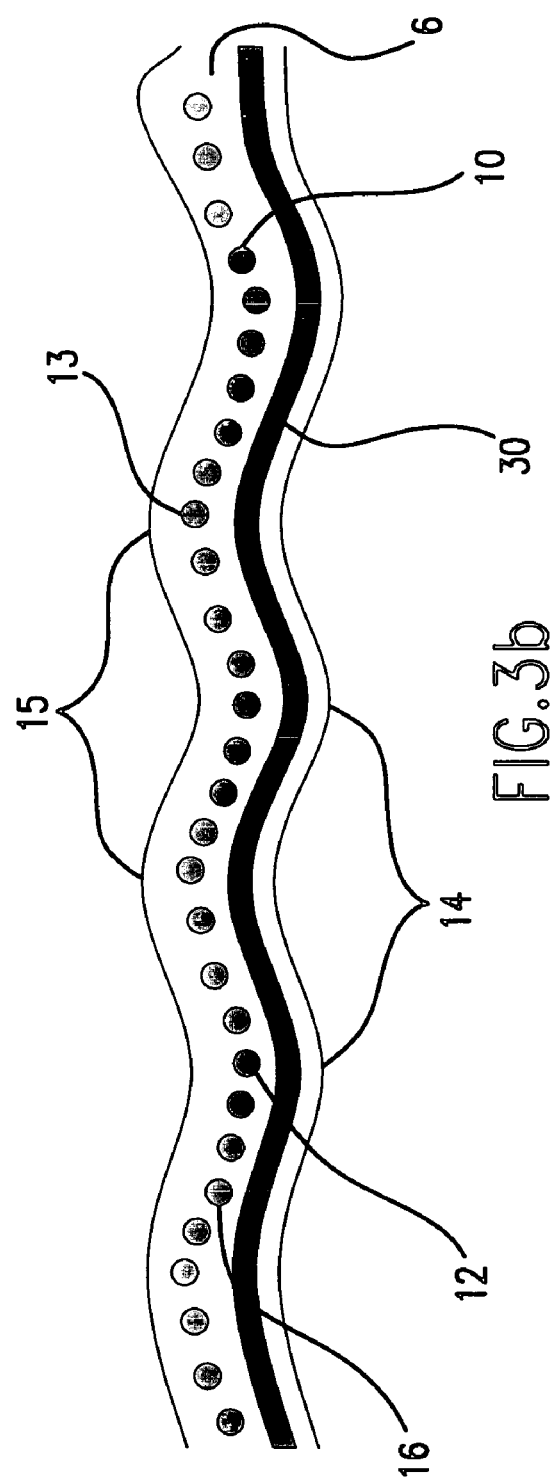

EXTENDED MOBILITY TIRE WITH UNDULATING SIDEWALLS

This application is a continuation of International Application Serial No. PCT/EP03/12499 filed on Nov. 10, 2003, and which published on Jun. 3, 2004 under Publication No. WO 2004/045879.

BACKGROUND

The present invention relates to tires. More particularly, it relates to a tire comprising a specific arrangement of the cords of the carcass-type reinforcement structure in the sidewalls, allowing the obtainment, on the one hand, under substantially normal pressure, of flexible sidewalls capable of imparting particularly favourable qualities, in particular of comfort and rolling resistance, and, on the other hand, under reduced pressure, of rigidified sidewalls capable of bearing the load on the tire, within certain limits.

For some years, tire manufacturers have been devoting considerable effort to developing original solutions to a problem dating back to the very first time use was made of wheels fitted with tires of the inflated type, namely how to allow the vehicle to continue on its journey despite a considerable or total loss of pressure in one or more tires. For decades, the spare wheel was considered to be the sole, universal solution. Then, more recently, considerable advantages have become apparent which may lead to the elimination thereof. The concept of "extended mobility" is being developed. The associated techniques allow travel to continue with the same tire, within certain limits, after a puncture or a drop in pressure. This allows the driver to travel to a repair point, for example, without having to stop, often in dangerous circumstances, to fit the spare wheel.

Two major types of extended mobility technology are currently available on the automobile market. On the one hand, there are tires of the self-supporting type (often known by their English abbreviation ZP, standing for "zero pressure"). Self-supporting tires are capable of bearing a load under reduced pressure, or indeed without pressure, thanks to sidewalls which are reinforced, most frequently by means of inserts of rubber material provided in the sidewalls. The structural rigidity of the sidewalls of a tire of this type is very high. Reinforced sidewall technologies favour operation in degraded mode, normally exceptional or at the very least very occasional for the vast majority of vehicles, to the detriment of everyday operation, which suffers the drawbacks intrinsic to the principle of reinforced sidewalls. In normal operation, at rated service pressure, this may entail considerable disadvantages in terms of rolling resistance and comfort. Furthermore, the strong tendency for the bottom zone of the tire to want to slide out of the rim under the effect of sidewall sagging may limit the impact of this solution.

On the other hand, wheels are available which are equipped with supports capable of supporting the inside of the tread of a tire in the event of sagging of the sidewalls following a drop in pressure. This solution is advantageously combined with a tire comprising a bottom zone capable of minimising the risk of the tire sliding out of the rim. This solution is advantageous since it makes it possible to keep substantially intact the characteristics of travel under normal conditions. On the other hand, it exhibits the drawback of requiring an additional component, the support, for each of the wheels of the vehicle.

SUMMARY OF THE INVENTION

Thus, in order to overcome these various drawbacks, the invention provides a tire comprising at least one carcass-type reinforcement structure anchored on each side of the tire in a bead whose base is intended to be fitted on a rim seat, each bead being extended radially towards the outside by a sidewall, the sidewalls meeting up radially towards the outside with a tread and comprising at least one substantially resilient circumferential cord disposed in the substantially median portion of said sidewalls, the carcass-type reinforcement structure extending circumferentially from the bead towards said sidewall, a crown reinforcement, each of the beads comprising furthermore an anchoring zone allowing the reinforcement structure to be retained i n each of said beads, said carcass-type reinforcement structure being arranged in such a way that, in the substantially median portion of the sidewall, the cords of said reinforcement structure exhibit different axial positions over the circumference, so as to form around the circumference, a succession of substantially regular undulations forming an undulating circumferential profile.

The solution proposed by the present invention makes it possible to eliminate the majority of the drawbacks associated with the current techniques allowing extended mobility. On the one hand, the tire does not require any support for travel at low pressure; on the other hand, it does not have rigid sidewalls reinforced for example by means of inserts of rubber material. The sidewalls exhibit a structural rigidity which varies with the deflection of the tire. Thus, when the tire travels at its rated pressure, the structural rigidity is that of a standard tire. The sidewalls exhibit a flexibility which is advantageously comparable to a conventional tire. Favourable characteristics such as a high level of comfort, a low rolling resistance, good endurance, etc., may be retained. The tire according to the invention thus exhibits the advantages associated with a self-supporting tire, which make it possible to ensure extended mobility, but without exhibiting the drawbacks which affect tire qualities during everyday use substantially at normal pressure.

In "extended mobility" mode, when the pressure drops the reduction in pressure causes an increase in the deflection and, by this very fact, the structural rigidity of the sidewalls: substantially progressively, in particular at the level of the zone of the tire in the vicinity of the area of contact with the ground, the undulations of the carcass-type reinforcement structure flatten out or become less pronounced; the undulations of the circumferential cords do likewise, with the progressive appearance of an increasing tensile force in the circumferential cords. These phenomena lead to a gradual blocking of the buckling of the sidewalls, until a supporting force is obtained which is capable of bearing the stresses transmitted by the sidewalls. Finally, after tensioning of the cords, sidewalls are obtained which are capable of bearing the load.

Since, after stretching of the undulating cords in the sidewalls, buckling of the sidewalls is in some way "blocked", considerable, or indeed total, sagging of the tire does not take place, in particular at the level of the contact area. The load is thus to a great extent borne by the tensioning of the circumferential cords. Thus, with greatly reduced or zero pressure, the tire operates with greater deflection and a considerably higher structural rigidity, not only in order to prevent total sagging of the sidewalls but also to make it possible to bear the load despite the drop in pressure, in a manner comparable to a self-supporting tire.

Said circumferential cord(s) are advantageously arranged with circumferentially oriented undulations. In this latter case, said cord(s) are arranged on the circumference in different axial positions, so as to form around the circumference a succession of substantially regular undulations forming an undulating circumferential profile. This is a clever and practical way of achieving the resilient function of the circumferential cords. In such a scenario, the cords may in themselves be substantially rigid. The required resilience is obtained because the cords are arranged in undulating manner.

According to one advantageous variant embodiment, the undulations formed by said circumferential cords on the one hand and the undulations formed by the reinforcement structure cords on the other hand are substantially congruent (are substantially aligned circumferentially).

According to one advantageous embodiment of the invention, the outer surface of said sidewall of the tire, in the zone where the reinforcement structure comprises said undulations, also exhibits an undulating circumferential profile, substantially congruent with said profile formed by said reinforcement structure. The undulations of the reinforcements and of the sidewall edge are preferably of a substantially similar amplitude and frequency, a homogeneous configuration thus being obtained. Furthermore, the sidewall undulations reveal the internal architectural characteristics of the tire. This latter aspect allows better identification of this type of technology, for example.

According to one variant, the outer surface of the sidewall is substantially rectilinear. The specific architecture of the reinforcement structure is thus not revealed, and the profile of the sidewall is of conventional configuration.

The paths followed by the reinforcement structures of carcass type may be arranged according to two types of configuration, for example either a "phase opposition" configuration, in which the radial position of a reinforcement cord, for a given circumferential position of the undulating circumferential profile, is substantially symmetrical in each sidewall relative to the median plane of said tire; or an "in phase" configuration, in which the radial position of a reinforcement structure portion, for a given circumferential position of the undulating circumferential profile, is substantially opposing in each sidewall.

BRIEF DESCRIPTION OF THE DRAWINGS

All practical details are given in the following description, supplemented by the accompanying figures.

FIG. 2b shows an arrangement of carcass reinforcement in a section taken through the sidewall along either of the two section lines B-B' (located outside of the sidewall median portion) in FIG. 2a.

FIG. 2c shows an arrangement of carcass reinforcement in a section taken through the sidewall along the section line A-A' (located in the sidewall median portion) in FIG. 2a.

FIG. 3a is a view similar to FIG. 2c showing a first alternative arrangement of carcass reinforcement along with a sidewall reinforcement cord.

FIG. 3b is a view similar to FIG. 2c showing a second alternative arrangement of carcass reinforcement along with a sidewall reinforcement cord.

DETAILED DESCRIPTION OF PREFERRED EMBODIMENTS

Figure 1A:
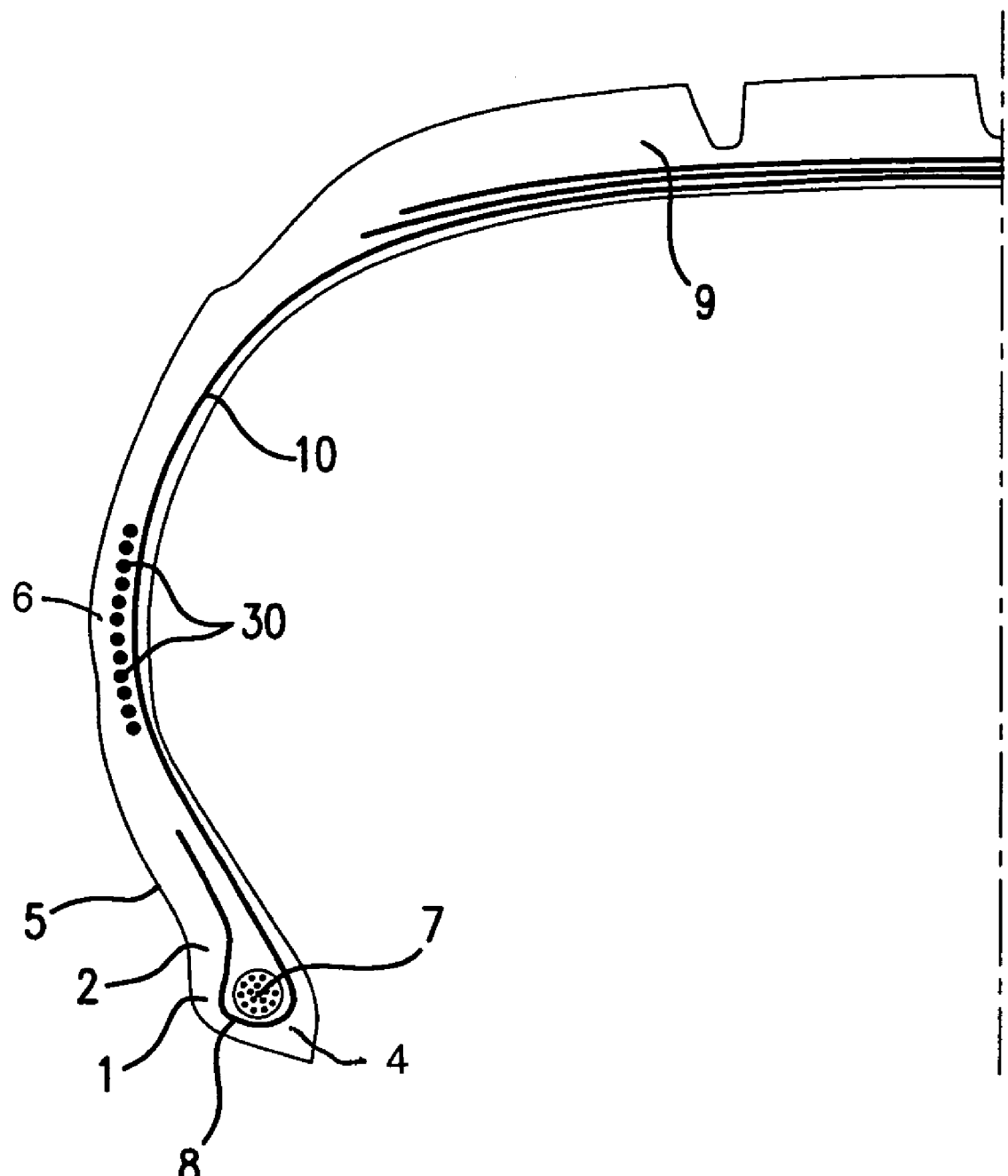
FIG. 1a is a radial sectional view through a tire according to the invention, showing a first form of bead anchoring for a carcass reinforcement, and a sidewall reinforcement in the form of circumferential cords.

Tire reinforcement armatures or tire reinforcements are currently—and most frequently—formed by stacking one or more plies conventionally designated "carcass plies", "crown plies", etc. This way of designating reinforcement armatures stems from the manufacturing process, which consists of making a series of semi-finished products in the form of plies, provided with, often longitudinal, cord reinforcements, which are then assembled or stacked so as to build a tire blank. The plies are made flat, with large dimensions, and are then cut as a function of the dimensions of a given product. The plies are also assembled substantially flat in a first phase. The blank thus produced is then shaped into the toroidal profile typical of tires. The semi-finished products known as "finishing products" are then applied to the blank, in order to obtain a product which is ready for vulcanisation.

Such a "conventional" type of process involves, in particular for the tire blank manufacturing phase, the use of an anchoring element (generally a bead wire), used to effect anchoring or retention of the carcass reinforcement in the tire bead zone. Thus, for this type of process, a turn-up is formed from a portion of all the plies constituting the carcass reinforcement (or of only some) around a bead wire disposed in the bead of the tire. The carcass reinforcement is thereby anchored in the bead.

The widespread use in the industry of this type of conventional process, despite numerous variants in the manner of producing the plies and the assemblies, has led the person skilled in the art to use a vocabulary derived from the process; hence the terminology in general use, comprising in particular the terms "plies", "carcass", "bead wire", "shaping" to designate transition from a flat profile to a toroidal profile, etc.

However, tires now exist which do not strictly speaking comprise "plies" or "bead wires" which fit the above definitions. For example, document EP 0 582 196 describes tires manufactured without the aid of semi-finished products in the form of plies. For example, the cords of the various reinforcement structures are applied directly to the adjacent layers of rubber mixes, the whole being applied in successive layers to a toroidal core, the shape of which allows the direct obtainment of a profile resembling the final profile of the tire being manufactured. Thus, in this case there are no longer "semi-finished products", or "plies" or "bead wires". The basic products such as the rubber mixes and the reinforcements in the form of cords or filaments are applied directly to the core. Since this core is toroidal in shape, the blank no longer has to be shaped in order to be transformed from a flat profile to a profile in the form of a torus.

Furthermore, the tires described in this document do not have the "traditional" carcass ply turn-up about a bead wire. This type of anchoring is replaced by an arrangement in which circumferential filaments are disposed adjacent to said sidewall reinforcing structure, the whole being immersed in an anchoring or bonding rubber mix.

Assembling processes using a toroidal core also exist which use semi-finished products specially adapted for rapid, effective and simple laying on a central core. Finally, it is also possible to use a composite comprising certain semi-finished products to achieve certain architectural aspects (such as plies, bead wires, etc), while others are achieved by the direct application of mixes and/or reinforcements in the form of filaments.

In the present document, so as to take account of recent technological developments both in the field of manufacture and in the design of products, the conventional terms such as "plies", "bead wires" etc are advantageously replaced by neutral terms or terms which are independent of the type of process used. Thus, the term "reinforcement of carcass type" or "sidewall reinforcement" may be used to denote the reinforcement cords of a carcass ply in the conventional process and the corresponding cords, generally applied at the level of the sidewalls, of a tire produced according to a process not using semi-finished products. The term "anchoring zone", for its part, may denote both the "traditional" carcass ply turn-up about a bead wire of a conventional process and the assembly formed by the circumferential filaments, the rubber mix and the adjacent sidewall reinforcement portions of a bottom zone produced using a process involving application on a toroidal core.

In the present description, the term "cord" denotes wholly generally both monofilaments and multifilaments, or assemblies such as cables, plied yarns or indeed any equivalent type of assembly, whatever the material of these cords and whatever the treatment they have undergone, for example surface treatment or coating or presizing to promote adhesion to the rubber. The expression "unitary cord" denotes a cord composed of a single element, unassembled. The term "multifilaments" denotes on the other hand an assembly of at least two unitary elements to form a cable, a plied yarn, etc.

It is known that, conventionally, the carcass ply or plies are turned up about a bead wire. The bead wire then fulfils a carcass anchoring function. Thus, in particular, it bears the tension which develops in the carcass cords for example under the effect of inflation pressure. The arrangement described in the present document makes it possible to ensure a similar anchoring function. It is likewise known to use the bead wire of conventional type to ensure clamping of the bead on a rim. The arrangement described in the present document also makes it possible to ensure a similar clamping function.

In the present description, "bonding" rubber or mix is understood to mean the rubber mix optionally in contact with the reinforcement cords, adhering thereto and capable of filling the gaps between adjacent cords.

"Contact" between a cord and a layer of bonding rubber is understood to mean the fact that at least some of the outer circumference of the cord is in intimate contact with the rubber mix constituting the bonding rubber.

Designated as "sidewalls" are those portions of the tire, most frequently exhibiting low flexural strength, situated between the crown and the beads. Designated as "sidewall mixes" are the rubber mixes situated axially towards the outside relative to the cords of the carcass reinforcement structure and to their bonding rubber. These mixes usually have a low modulus of elasticity.

Designated as "bead" is the portion of the tire radially inwardly adjacent the sidewall.

The "modulus of elasticity" of a rubber mix is a secant modulus of extension obtained under uniaxial extension deformation of the order of 10% at ambient temperature.

As a reminder, "radially towards the top" or "radially upper" or "radially towards the outside" means towards the larger radii.

In the present specification, the term "cord" denotes wholly generally both monofilaments and multifilaments, or assemblies such as cables, plied yarns or indeed any equivalent type of assembly, whatever the material of these cords and whatever the treatment they have undergone, for example surface treatment or coating or presizing to promote adhesion to the rubber.

A reinforcing or reinforcement structure of carcass type is radial when its cords are is arranged at 90°, but also, according to the terminology in use, at an angle close to 90°.

The characteristics of the cord are understood to mean, for example, its dimensions, its composition, its mechanical characteristics and properties (in particular the modulus), its chemical characteristics and properties etc.

FIG. 1 shows the bottom zone, in particular the bead 1, in a first form of embodiment of the tire according to the invention. The bead 1 comprises an axially outer portion 2 provided and shaped in such a way as to be placed against the flange of a rim. The upper or radially outer portion of the portion 2 forms a portion 5 conformed to the rim hook. This portion is frequently curved axially towards the outside, as illustrated in FIG. 1. The portion 2 ends radially and axially towards the inside in a bead seat 4, adapted to be disposed against a rim seat. The bead likewise comprises an axially inner portion 3, extending substantially radially from the seat 4 towards the sidewall 6.

The tire also comprises a reinforcing structure 10 or carcass-type reinforcement structure provided with reinforcements advantageously configured in a substantially radial arrangement. This structure may be arranged continuously from one bead to the other, passing via the sidewalls and the crown of the tire, or, alternatively, it may comprise two or more parts, arranged for example along the sidewalls, without covering the entire crown.

In order to position the reinforcement cords as precisely as possible, it is highly advantageous to build the tire on a rigid support, for example a rigid core determining the shape of the inner cavity thereof. All the constituents of the tire are applied to this core, in the order required by the final architecture, being arranged directly in their final location without the profile of the tire having to be modified during building.

Two main types of anchoring of the carcass-type reinforcement structure are possible. Typically, the turn-up of said structure 10 around a bead wire 7 at the is level of the bead 1 ensures anchoring of the carcass-type reinforcement structure in the bead, as shown for example in FIG. 1b.

Figure 1B:
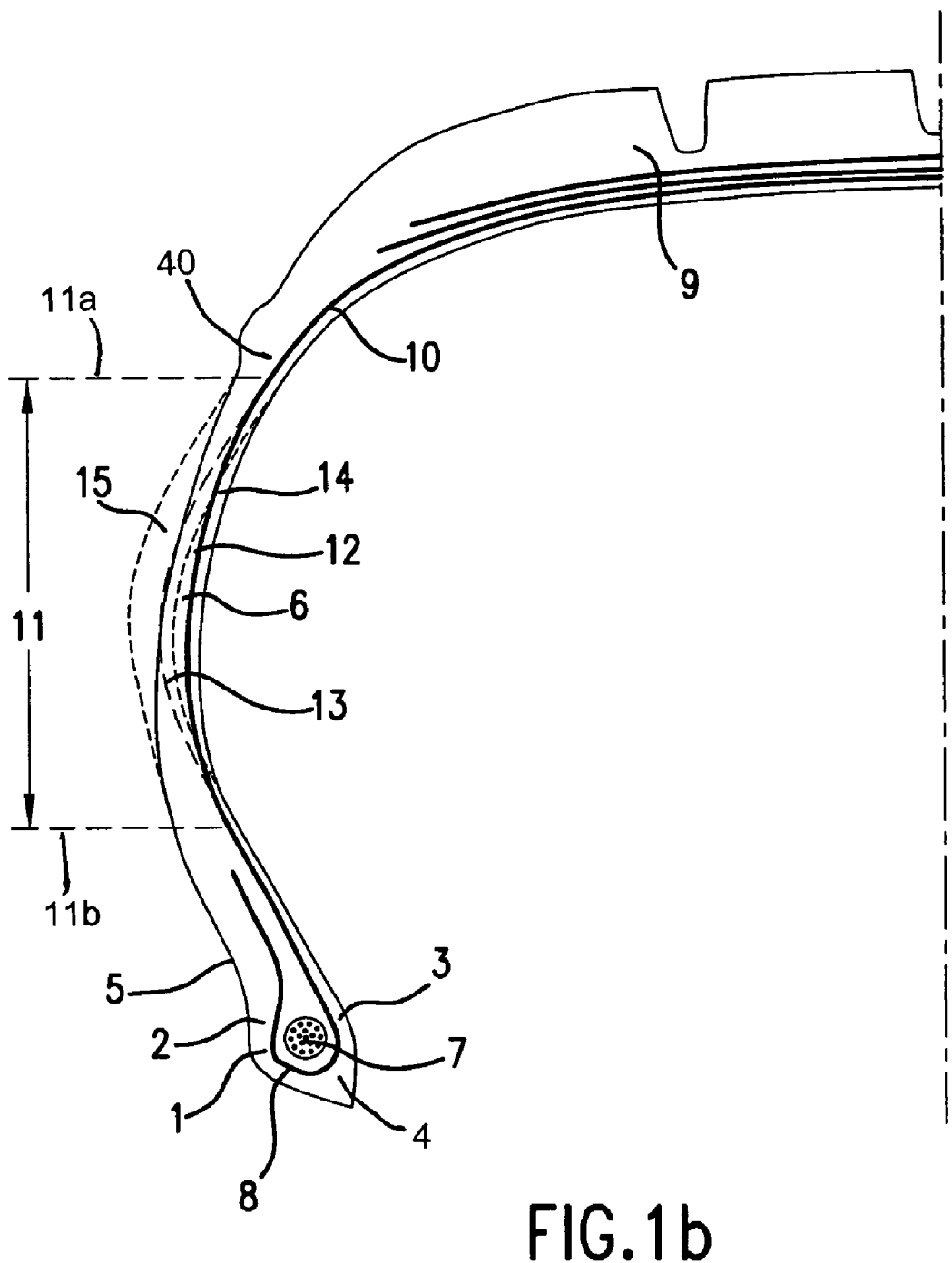
FIG. 1b is a view similar to FIG. 1a showing the carcass reinforcement of FIG. 1a as including an undulating configuration in a median portion of the tire sidewall, and wherein the sidewall reinforcement shown in FIG. 1a is omitted from FIG. 1b.
Figure 1C:
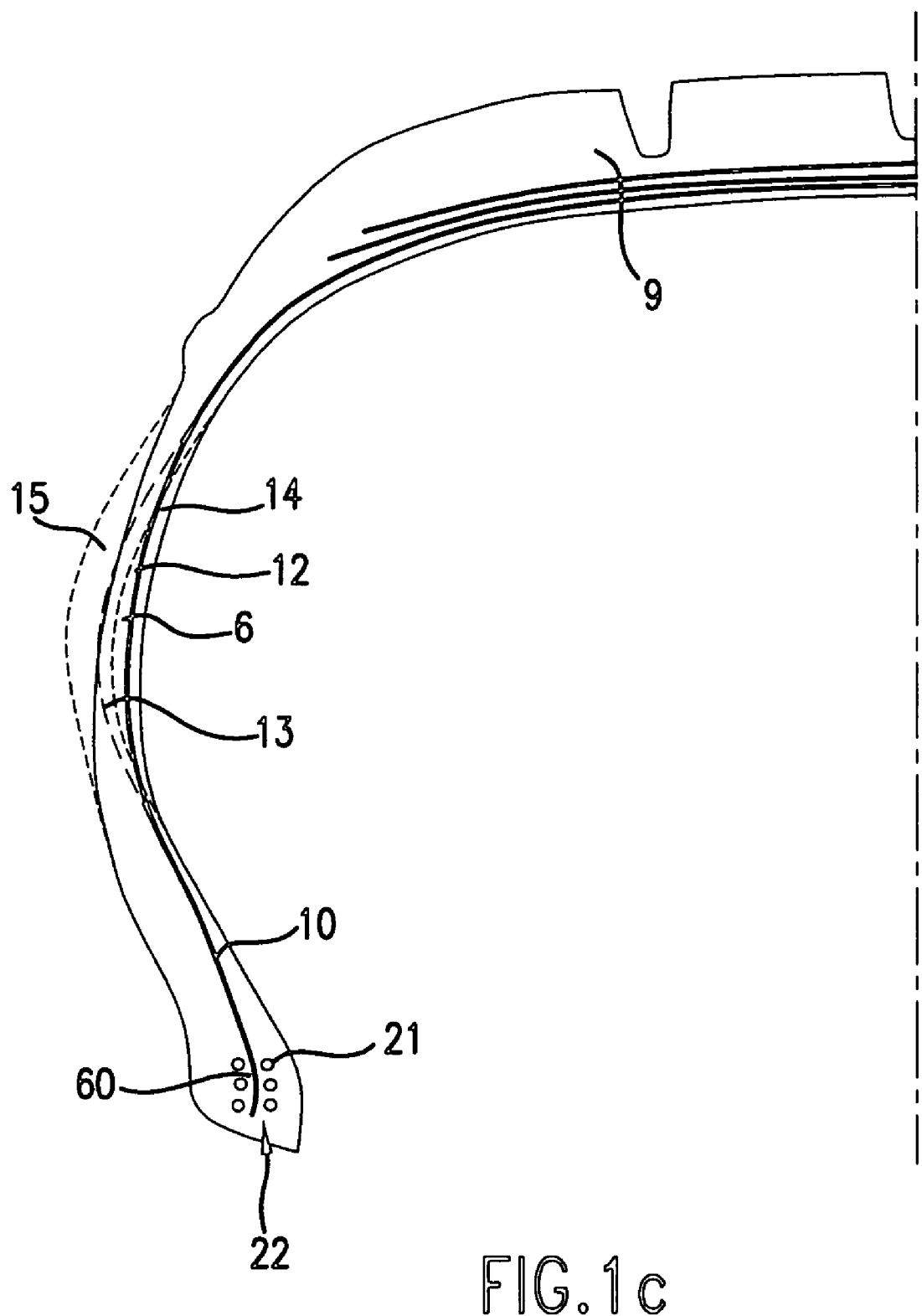
FIG. 1c is a view similar to FIG. 1a showing a modified type of bead anchoring for the carcass reinforcement, the tire including the undulating carcass reinforcement of FIG. 1b and the sidewall reinforcement of FIG. 1a (not shown in FIG. 1c).

Otherwise, the anchoring function may be achieved by an arrangement of circumferential cords, as shown for example in FIG. 1c. Circumferential cords 21, preferably arranged in the form of piles 22, form an arrangement of anchoring cords, provided in each of the beads. These cords are preferably of metal, and optionally brass coated. Various variants advantageously provide cords of textile type, such as for example of aramid, nylon, PET, PEN or a hybrid. In each pile, the cords are advantageously substantially concentric and superposed.

In order to ensure perfect anchoring of the reinforcement structure, a composite, stratified bead is produced. Inside the bead 1, the circumferentially oriented cords 21 are arranged between the cord rows of the reinforcement structure. These cords are disposed in a pile 22 as in the Figures, or in several adjacent piles, or in any sensible arrangement, depending on the type of tire and/or the characteristics sought.

The radially inner end portions of the reinforcement structure 10 cooperate with the cord windings, so achieving anchoring of these portions in said beads. To assist in this anchoring, the space between the circumferential cords and the reinforcement structure is occupied by a bonding or anchoring rubber mix 60. It is also possible to use a plurality of mixes having different characteristics, delimiting a plurality of zones, the combinations of mixes and resultant arrangements being virtually unlimited. By way of non-limiting example, the modulus of elasticity of such a mix may reach or exceed 10 to 15 MPa, and even in some cases reach or indeed exceed 40 MPa.

The cord arrangements may be arranged and manufactured in various ways. For example, a pile may advantageously consist of a single cord wound (substantially at zero degrees) in a spiral of several turns, preferably from the smallest diameter to the largest diameter. A pile may also consist of a plurality of concentric cords positioned one inside the other, so as to superpose rings of progressively increasing diameter. It is not necessary to add a rubber mix to ensure impregnation of the reinforcement cord, or of the circumferential cord windings.

FIGS. 1b and 1c show the different courses which may be adopted for the carcass-type reinforcement structure 10. A sidewall zone with undulations 11 extends radially in the sidewall between the bead 1 and the crown zone 9. The zone 11 has a radially outer border 11a spaced radially inwardly from the crown zone 9 by the tire's shoulder 40 and a radially inner border 11b spaced radially outwardly from the bead 1. Outside this zone, all the cords of carcass-type structure occupy a substantially identical radial position in the sidewall, but in this zone lithe various cords distributed along the sidewall do not all occupy the same radial position. This is clearly visible from FIGS. 2c, 3a and 3b in addition to FIGS. 1b and 1c. The various possible positions are located between a reinforcement structure path which is axially furthest to the inside 12 and a reinforcement structure path which is axially furthest to the outside 13 (in broken lines).

Between these extreme positions, one or more series of intermediate positions 16 are possible, as shown for example in FIGS. 3a and 3b. Otherwise, as shown in FIG. 2c, arrangements using only the limit positions are possible, without any intermediate position.

Figure 2A:
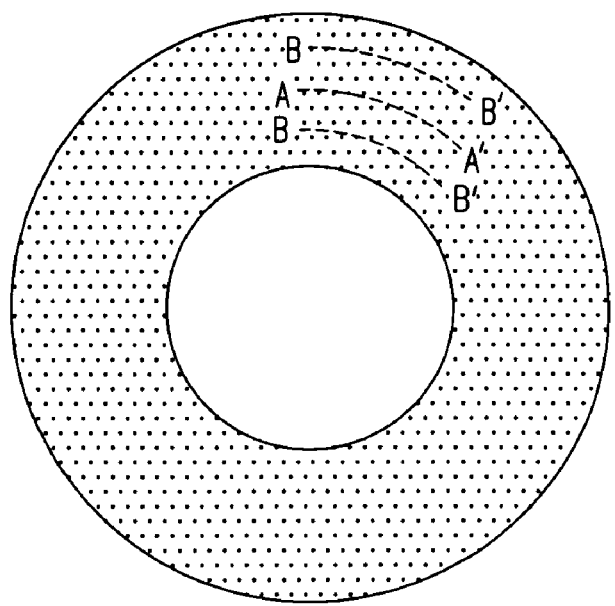
FIG. 2a is a schematic view of a tire sidewall showing three radially-spaced sectional lines B-B: A-A' and B-B' therethrough.
Figure 2B:
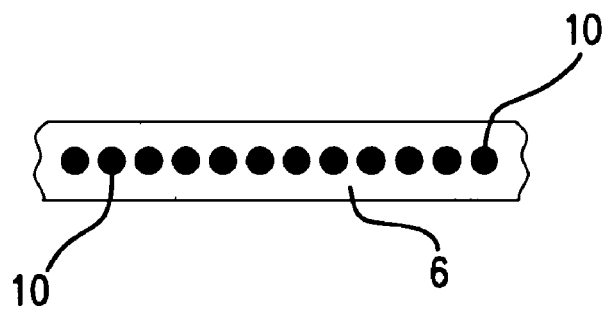
Figure 2C:
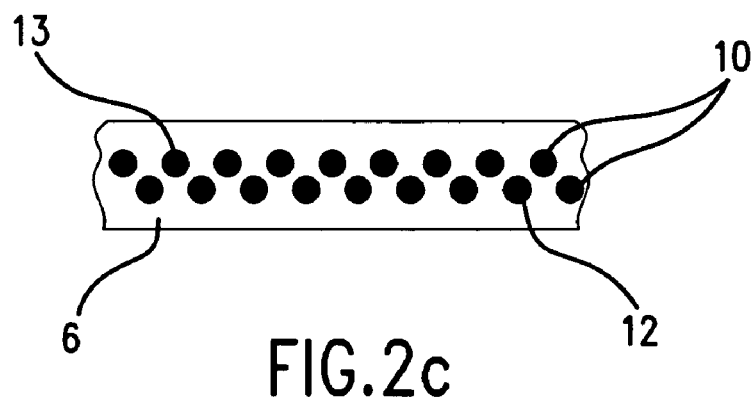

FIGS. 2b and 2c show well the nuances or variations in the axial positions of the reinforcement structure cords in the sidewall, as a function of the radial position in the latter. Thus, FIG. 2b shows well a substantially linear arrangement of the cords in the sidewall, insofar as the cords are observed outside the undulating zone, such as, for example at the radial positions B-B' illustrated in FIG. 2a. FIG. 2c shows the same cords at a radial position corresponding substantially to the undulating zone, such as, for example at the radial position A-A' illustrated in FIG. 2a. Zone A-A' is thus included in the undulating zone 11 or multi-position range.

At least one circumferential cord 30 is disposed in the sidewall. FIGS. 1a, 3a and 3b show examples of sidewalls in which such cords are arranged. These are advantageously cords of substantially resilient type, and they are disposed preferably in the substantially median portion of the sidewalls. In general, this portion corresponds to the section of the sidewalls of larger width. In FIGS. 1b, 1c, 2b, 2c as well as 4a and 4b, these cords are not shown, in order not to overload the Figures.

Figure 6:
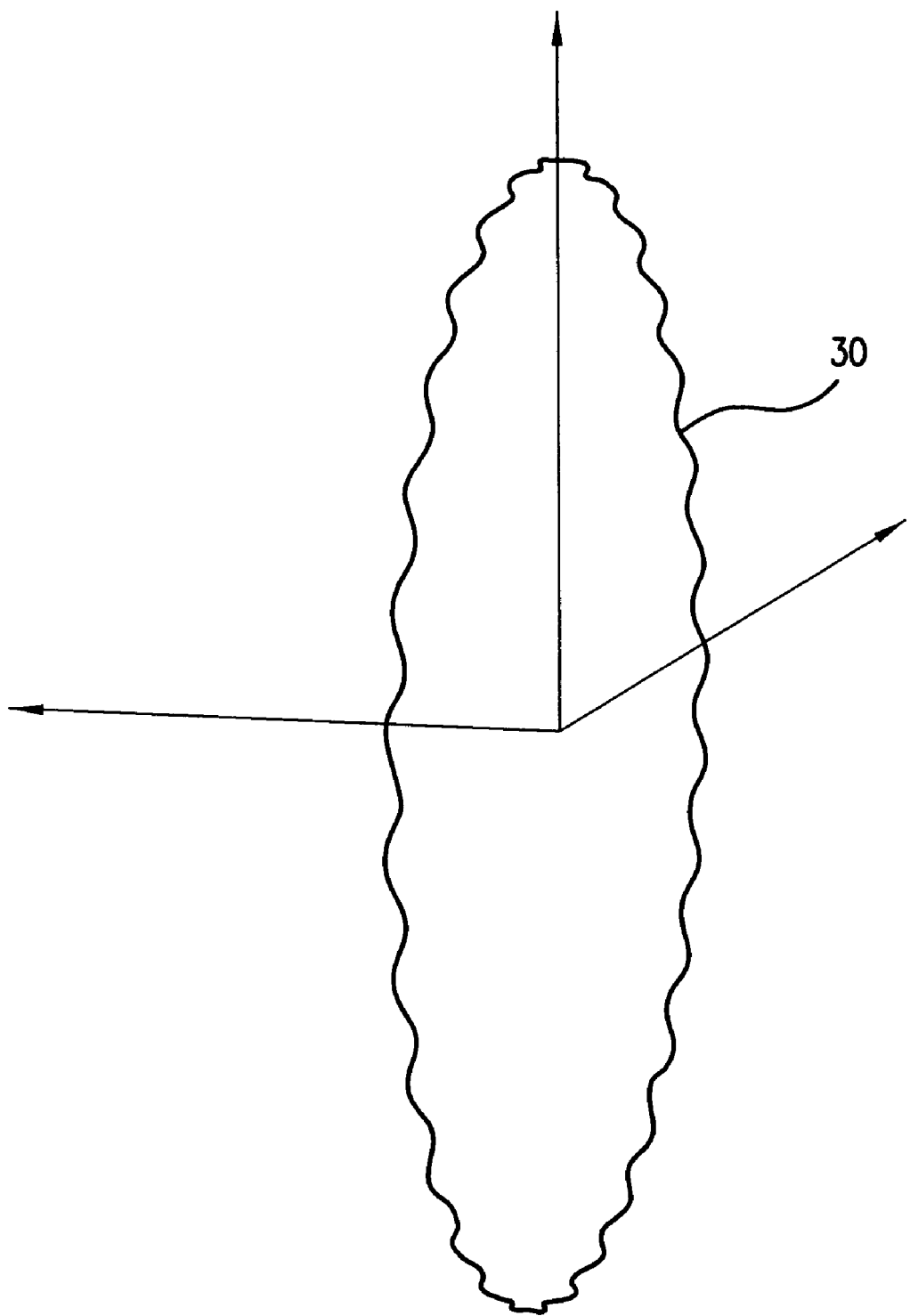
FIG. 6 shows a perspective view of a circumferential sidewall cord, arranged in undulating manner.

The circumferential cords are arranged around the circumference of the tire with circumferential undulations. In this way, the cords do not always occupy the same axial position as a function of the angular position on the sidewall. On the other hand, if a plurality of substantially parallel cords are used, these preferably undulate in such a way as to follow similar paths. The cords are thus sometimes further towards the inside, sometimes further towards the outside, forming undulations or waves extending circumferentially, along the sidewalls. These undulations are advantageously similar (comparable wavelengths, amplitudes, etc) to those of the cords of the carcass-type reinforcement structure. Furthermore, the undulations of these two types of element are advantageously in phase, so as to be substantially congruent along their respective paths. FIG. 6 shows an example of such a circumferential cord with undulations, shown in perspective view as a function of the three conventional axes, in order better to display said undulations. Of course, the undulations may be smaller than those shown in this Figure.

Figure 4A:
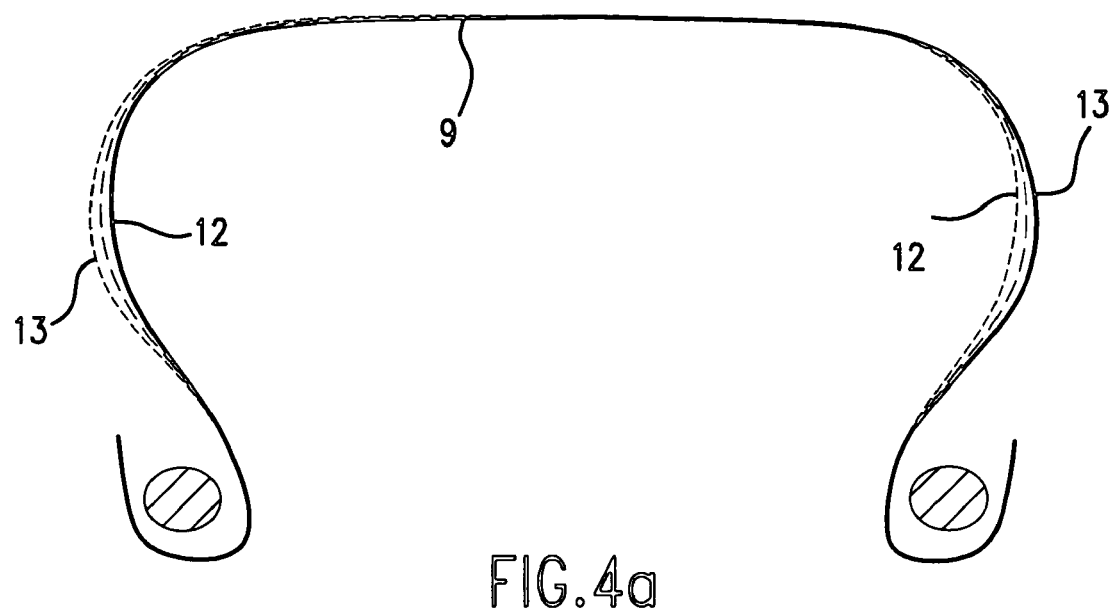
FIGS. 4 and 4b are radial sections showing respective paths taken by sidewall reinforcement cords in each of the sidewalls, in phase in 4a and in phase opposition in 4b.
Figure 4B:
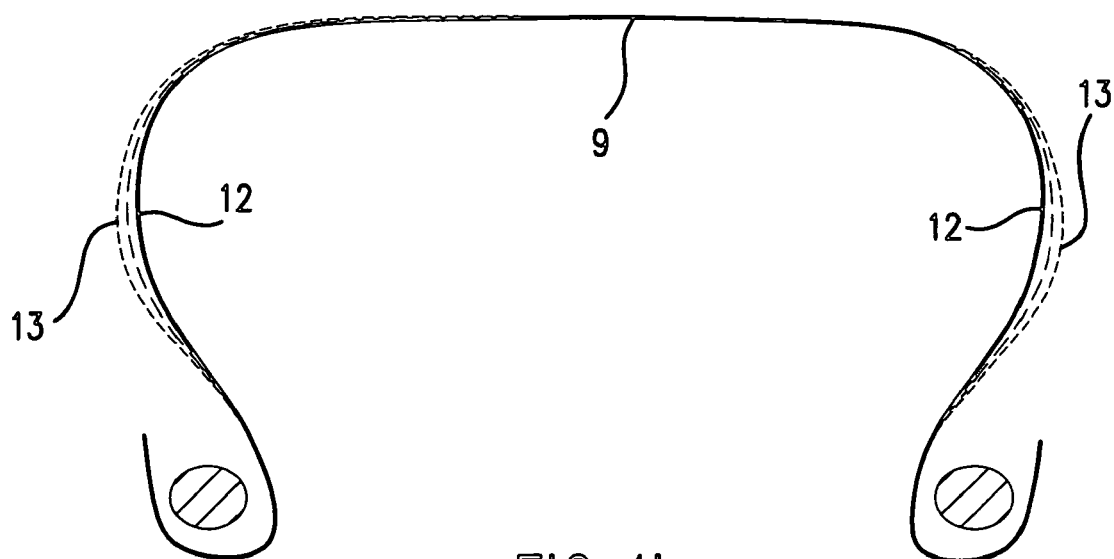

FIGS. 4a and 4b show two examples of paths taken by the reinforcement structures of carcass type from one bead of the tire to the other. In 4b, the path is symmetrical, or similar on each side of the meridional axis of symmetry of the tire. Thus, the various portions of the undulations on either side of the tire are aligned as follows: the troughs opposite the troughs, the peaks opposite the peaks. Such symmetry has several advantages, in particular from the point of view of the behaviour of a tire which is statically and dynamically well balanced.

In 4a, the various portions of the undulations on either side of the tire are in phase: the troughs of a first side opposite the peaks of the second side, the peaks of the first side opposite the troughs of the second. Such an asymmetrical arrangement has several advantages, in particular from the point of view of manufacture of the tire, since all the reinforcement structure portions between the two beads are of equal length, irrespective of their circumferential position or whether they are located in a trough or a peak.

Figure 5A:
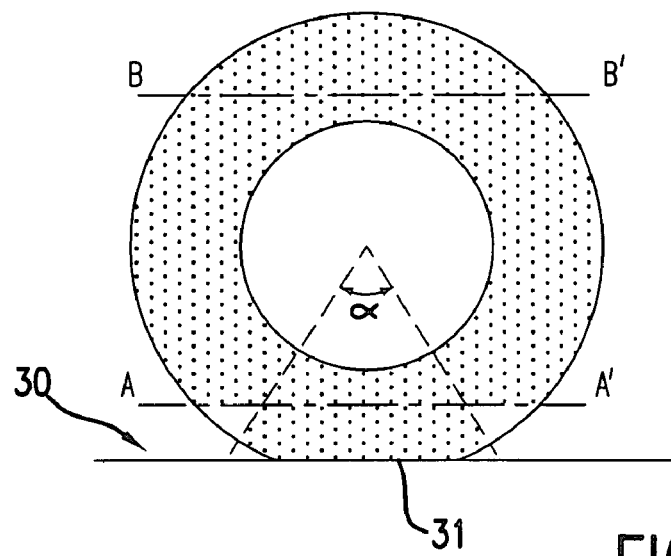
FIG. 5a is a schematic view of a tire sidewall showing section lines B-B' and A-A' therethrough.
Figure 5B:
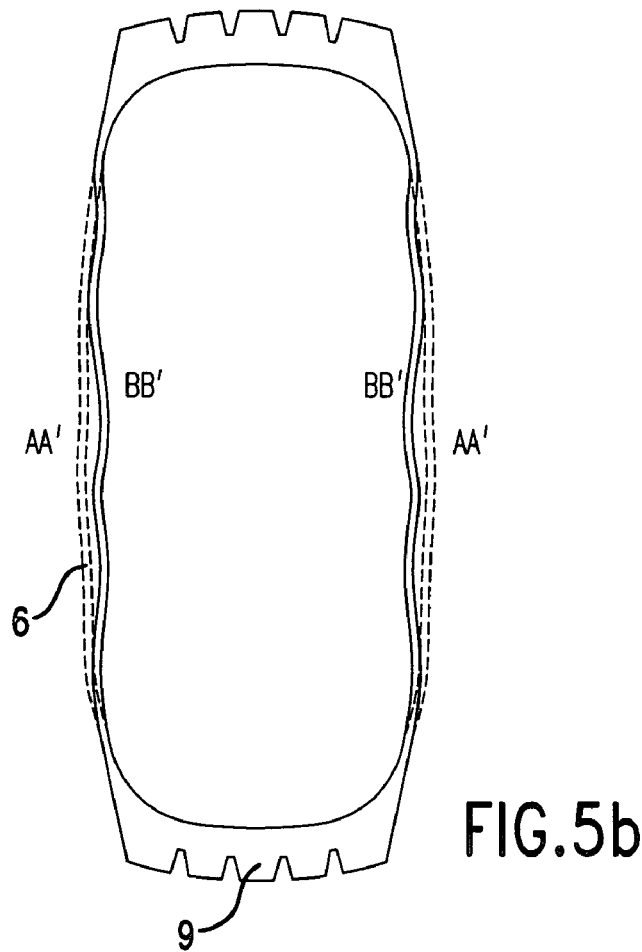
FIG. 5b shows the profile of the sidewalls of a tire according to the invention in cross-section, taken at different positions shown in FIG. 5a: at A-A' in the "stretched" or "tightened sidewall" zone and at B-B' in the "undulating sidewall" zone.

FIGS. 5a and 5b show the influence of the angular position of a tire according to the invention relative to the ground 30 on the dynamic development of the shape and amplitude of the undulations. In the zone of the sidewall defined by the angle α, corresponding substantially to the area 31 in contact with the ground 30, the sidewall suffers mechanical stress tending to tighten, stretch or straighten the undulations, as shown in FIG. 5b for the profile A-A' in dotted lines, corresponding to the section A-A' of FIG. 5a. FIG. 5b additionally shows, in solid lines, the profile B-B', with undulations, corresponding to the section B-B' of FIG. 5a, that is to say in a zone not affected by the contact area.

Drawing a parallel with the dynamic behaviour of a tire of the conventional radial type (without undulations), the following points may be noted. At the time of transition to the contact area 31, multiple mechanical stresses become involved. Between the entry point and the exit point of the contact area, the tire suffers considerable elongation stress in the circumferential direction. At the level of the sidewalls, these stresses cause the phenomenon of "deradialisation" of the cords of the reinforcement structure. The cords therefore have a tendency to separate from one another, following resilient stretching of the rubber mix of the sidewall between the cords. This phenomenon itself causes a degree of heating of the tire, which contributes to an increase in rolling resistance and affects the endurance of the product.

With a tire according to the invention, comprising a sidewall zone with undulations, the same mechanical stresses arise between the points of entry into and of exit from the contact area. However, the undulations provide a sort of "reserve" of material, available to respond to the various mechanical stresses due to the deformations arising on transition to the contact area, and in particular the circumferential stresses. This available reserve reduces or may even in some cases prevent recourse to stretching of the rubber mix between the cords. Deformation of the undulations is thus witnessed in the angular zone of the tire corresponding to the contact area. Said undulations "flatten out" or reduce in amplitude. The mechanical stresses due to the contact area are thus in some way damped or absorbed by the undulations of the sidewalls. This deformation is accompanied by heating which is substantially limited relative to stretching of the rubber mix. The characteristics of rolling resistance and endurance are consequently not greatly affected.

During the undulation flattening phase, the cords 30 exhibit similar behaviour, such that their undulations also flatten out, to the point that the cords become increasingly subject to circumferential tension forces. The tensioned circumferential cords cause substantially progressive blocking of the buckling of the sidewalls. In the end, these cords have the effect of supporting the sidewalls, which are no longer able to sag. The sidewalls may thus support or bear the stresses, something in the manner of a self-supporting tire, but with support provided by an element acting circumferentially rather than radially.

This phenomenon of progressive circumferential blocking thus allows distinct situations: in normal pressure mode, with undulation of the circumferential cords and of the cords of the carcass-type reinforcement structure, the sidewalls are substantially flexible; in low pressure mode, with increasing attenuation of the two types of undulations in the portion of the tire corresponding substantially to the zone of contact with the ground, the rigidification of the sidewalls allows a self-supporting function to be implemented.

Industrial manufacture of a tire according to the invention may be achieved using several types of process. It is advantageous to apply the principle of laying on a central core, so allowing individual laying of the constituent elements such as the rubber mixes and the reinforcements (cords) or alternatively the laying of semi-finished products such as reinforced rubber strips. With such a process, use is made of a central core provided with undulations in the zone corresponding substantially to the zone 11 of the tire, thus allowing the undulating sidewall shape or profile, as described above, to be imparted as soon as the various elements are laid.

The invention claimed is:

1. A tire comprising a reinforced crown, at least one carcass-type reinforcement structure extending circumferentially and anchored on each side of the tire in a bead whose base is intended to be fitted on a rim seat, each bead extended radially towards the outside by a sidewall, the sidewall meeting up radially towards the outside with a tread and comprising at least one substantially resilient circumferential cord disposed in the substantially median portion of said sidewall, each of the beads comprising furthermore an anchoring zone in which the carcass-type reinforcement structure is retained, said carcass-type reinforcement structure including a ply of carcass cords wherein a portion of each carcass cord is disposed in a sidewall and extends from a respective bead to the crown, the carcass cords arranged in such a way that, on the one hand, in a substantially median zone of the sidewall, the immediately adjacent carcass cords of said ply exhibit different respective axial positions over the circumference, so as to form in the sidewall zone a succession of substantially regular undulations forming an undulating circumferential profile, and on the other hand, outside the sidewall zone, all cords of said ply exhibit substantially identical respective axial positions, the sidewall zone having a radially outer border spaced radially inwardly from the crown and a radially inner border spaced radially outwardly from the respective bead.

2. The tire of claim 1, wherein in said sidewall zone, the carcass-type reinforcement structure is located between a first reinforcement structure path axially furthest to the inside and a second reinforcement structure path axially furthest to the outside.

3. The tire of claim 1, in which the outer surface of said sidewall of the tire, in the sidewall zone where the reinforcement structure comprises said undulations, also exhibits an undulating circumferential profile, substantially congruent with said undulating profile formed by said reinforcement structure.

4. The tire of claim 1, in which the radial position of a reinforcement cord, for a given circumferential position of the undulating circumferential profile, is substantially symmetrical in each sidewall relative to the median plane of said tire.

5. The tire of claim 1, in which the radial position of a reinforcement cord, for a given circumferential position of the undulating circumferential profile, is substantially opposing in each sidewall.

* * * * *